US011592225B2

(12) United States Patent
Berg et al.

(10) Patent No.: US 11,592,225 B2
(45) Date of Patent: Feb. 28, 2023

(54) METHOD AND SYSTEM FOR THE HEAT-PUMP CONTROL TO REDUCE LIQUID REFRIGERANT MIGRATION

(71) Applicant: Lennox Industries Inc., Richardson, TX (US)

(72) Inventors: Eric Berg, The Colony, TX (US); Wenqian Liu, Plano, TX (US); Umesh Gokhale, Irving, TX (US); Srini Natarajan, Carrollton, TX (US); Jeff Mangum, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 206 days.

(21) Appl. No.: 17/102,660

(22) Filed: Nov. 24, 2020

(65) Prior Publication Data

US 2022/0163247 A1     May 26, 2022

(51) Int. Cl.
*F25B 49/02*     (2006.01)
*F25B 13/00*     (2006.01)

(52) U.S. Cl.
CPC .............. *F25B 49/02* (2013.01); *F25B 13/00* (2013.01)

(58) Field of Classification Search
CPC ................................. F25B 49/02; F25B 13/00
See application file for complete search history.

(56) References Cited

U.S. PATENT DOCUMENTS

| 4,734,628 | A  | * | 3/1988  | Bench   | F25B 49/022 |
|           |    |   |         |         | 388/930     |
| 10,533,556 | B2 | * | 1/2020  | Johnson | F04C 29/124 |
| 2006/0042277 | A1 | * | 3/2006 | Sadegh  | F24F 11/30  |
|           |    |   |         |         | 374/E15.001 |
| 2013/0047630 | A1 | * | 2/2013 | Lu      | F25B 40/00  |
|           |    |   |         |         | 62/3.6      |
| 2013/0247600 | A1 | * | 9/2013 | Lu      | F25D 17/067 |
|           |    |   |         |         | 62/89       |
| 2013/0291568 | A1 | * | 11/2013 | Elstroem | G01F 23/04 |
|           |    |   |         |         | 62/126      |
| 2015/0377536 | A1 | * | 12/2015 | West    | F25B 49/022 |
|           |    |   |         |         | 62/126      |
| 2016/0025396 | A1 | * | 1/2016  | Marshall | F25B 41/34 |
|           |    |   |         |         | 62/126      |
| 2016/0273816 | A1 | * | 9/2016  | Horiuchi | F25B 13/00 |
| 2017/0370626 | A1 | * | 12/2017 | Ohyama  | F25B 5/04   |

* cited by examiner

*Primary Examiner* — Henry T Crenshaw
(74) *Attorney, Agent, or Firm* — Shackelford, Bowen, McKinley & Norton, LLP

(57) ABSTRACT

A method of mitigating liquid-refrigerant migration includes comparing a requested compressor speed of a variable-speed compressor to a pre-defined threshold and, responsive to a determination that the requested compressor speed is greater than the pre-defined threshold, operating the variable-speed compressor at a first compressor speed that is less than the requested compressor speed.

18 Claims, 3 Drawing Sheets

METHOD AND SYSTEM FOR THE HEAT-PUMP CONTROL TO REDUCE LIQUID REFRIGERANT MIGRATION

TECHNICAL FIELD

The present disclosure relates generally to heating, ventilation, and air conditioning (HVAC) systems and more particularly, but not by way of limitation, to heat-pump control to reduce liquid-refrigerant migration.

BACKGROUND

This section provides background information to facilitate a better understanding of the various aspects of the disclosure. It should be understood that the statements in this section of this document are to be read in this light, and not as admissions of prior art.

Vapor-compression systems are used to regulate environmental conditions within an enclosed space. Typically, such systems have a circulation fan that pulls air from the enclosed space through ducts and pushes the air back into the enclosed space through additional ducts after conditioning the air (e.g., heating or cooling). To direct operation of the circulation fan and other components, such systems include a controller. In addition to directing operation of the system, the controller may be used to monitor various components of the system to determine if the components are functioning properly.

In vapor-compression systems, a refrigerant undergoes phase changes. During operation of such systems, refrigerant can migrate into a system compressor when, for example, an operating mode of the system is changed from a defrost mode to a heating mode. This is undesirable. During a defrost cycle, liquid refrigerant can accumulate in an outdoor coil of the vapor-compression system. When the defrost cycle has completed and operation of the system in the heating mode is initiated, liquid refrigerant stored in the outdoor coil can migrate into an accumulator and eventually into a compressor chamber, which migration can cause damage to the compressor. Liquid migration can also wash out compressor lubricant, which can lead to overheating of the compressor and eventual compressor failure. Sometimes use of the accumulator is a satisfactory mitigation of the problem of liquid-refrigerant migration; however, even when the accumulator is utilized, liquid-refrigerant migration sometimes still occurs.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A method of mitigating liquid-refrigerant migration includes comparing a requested compressor speed of a variable-speed compressor to a pre-defined threshold and, responsive to a determination that the requested compressor speed is greater than the pre-defined threshold, operating the variable-speed compressor at a first compressor speed that is less than the requested compressor speed.

A computer-program product includes a non-transitory computer-usable medium having computer-readable program code embodied therein. The computer-readable program code is adapted to be executed to implement a method. The method includes comparing a requested compressor speed of a variable-speed compressor to a pre-defined threshold and, responsive to a determination that the requested compressor speed is greater than the pre-defined threshold, operating the variable-speed compressor at a first compressor speed that is less than the requested compressor speed.

An information handling system includes a processor. The processor is operable to implement a method. The method includes comparing a requested compressor speed of a variable-speed compressor to a pre-defined threshold and, responsive to a determination that the requested compressor speed is greater than the pre-defined threshold, operating the variable-speed compressor at a first compressor speed that is less than the requested compressor speed.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
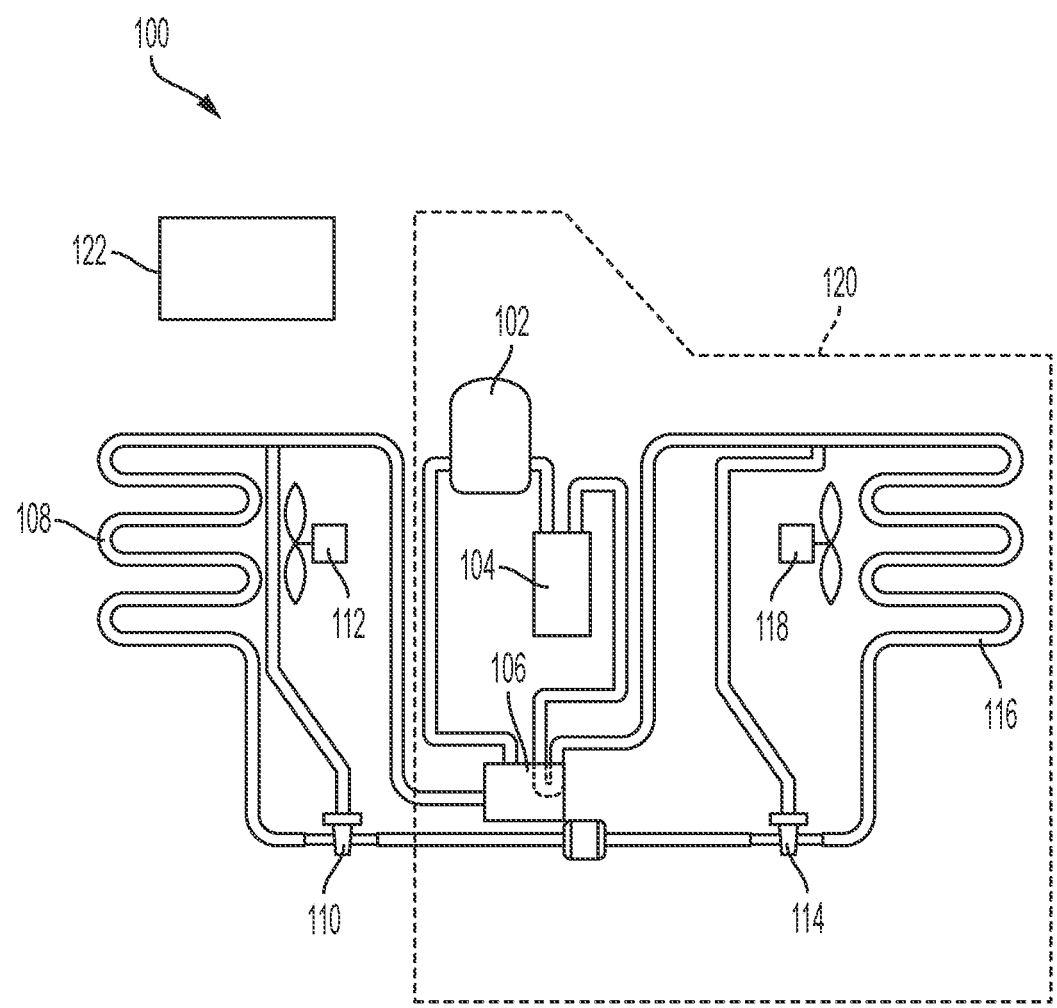
FIG. 1 is a block diagram of an illustrative vapor-compression system.

FIG. 1 is a schematic diagram of an illustrative vapor-compression system 100. The vapor-compression system may operate in a heating mode or in a defrost mode. The vapor-compression system 100 includes a variable-speed compressor 102, an accumulator 104, a reversing valve 106, a condenser 108, an expansion device 110, a condenser fan 112, an expansion device 114, an evaporator 116, an evaporator fan 118, and a controller 122. What is referred to as an outdoor unit 120 includes the variable-speed compressor 102, the accumulator 104, the reversing valve 106, the expansion device 114, the evaporator 116, and the evaporator fan 118. The condenser 108, the expansion device 110, and the condenser fan 112 are located inside an enclosed space to be heated. In a typical embodiment, each of the expansion devices 110 and 114 may be, for example, a thermostatic expansion valve or a throttling valve. The vapor-compression system 100 is controlled via the controller 122.

When the vapor-compression system 100 is operating in the heating mode, refrigerant leaves the variable-speed compressor 102 as a high-temperature high-pressure vapor and passes to the reversing valve 106. The reversing valve 106 is positioned in the heating mode so the refrigerant passes through the reversing valve 106 and is directed to the condenser 108 which, as noted above, is located inside the enclosed space to be heated. Cool air is blown by the condenser fan 112 over the condenser 108 inside the enclosed space to remove some of the thermal energy from the refrigerant and provide heating to the enclosed space. As heat is removed from the refrigerant, the refrigerant condenses into a liquid. Having given up some of its energy to provide heat to the enclosed space, the refrigerant leaves the condenser 108 as a high-pressure slightly cooler liquid.

The refrigerant is directed from the condenser 108 to the expansion device 110 and then to the expansion device 114. Because the vapor-compression system 100 is in the heating mode, the expansion device 110 is closed such the liquid refrigerant passes through the expansion device 110 and is directed to the expansion device 114. The refrigerant passes through the expansion device 114, where the refrigerant expands in volume and turns into a part-liquid part-vapor mixture. This expansion of the refrigerant by the expansion device 114 reduces the temperature and pressure of the refrigerant. As the refrigerant exits the expansion device 114, the refrigerant is a low-pressure low-temperature liquid/vapor mixture.

From the expansion device 114, the refrigerant is directed to the evaporator 116. The evaporator fan 118 blows outside ambient air over coils of the evaporator 116, which serves to add heat to the refrigerant. Because the refrigerant boils at a very low temperature, as it boils, thermal energy imparted to the refrigerant from the outside ambient air is carried away. Thermal energy is picked up by the refrigerant from the outside ambient air and the refrigerant leaves the evaporator 116 as a low-pressure low-temperature slightly superheated vapor and is directed to the reversing valve 106. The reversing valve 106 diverts the refrigerant to the accumulator 104. From the accumulator 104, the refrigerant returns to the variable-speed compressor 102.

If the vapor-compression system 100 is then switched into the defrost mode, the variable-speed compressor 102 forces the high-pressure high temperature vapor refrigerant into the reversing valve 106. The reversing valve 106 diverts this high-pressure high-temperature vapor refrigerant to the evaporator 116, which in the defrost mode operates as a condenser. The evaporator fan 118 is turned off in order to increase the temperature of the refrigerant in the coil of the evaporator 116 in order to melt frost on the coil of the evaporator 116. Since the refrigerant is at a warmer temperature than the surrounding air, thermal energy of the refrigerant is carried away. The refrigerant condenses as it loses thermal energy and leaves the evaporator 116 as a high-pressure lower temperature liquid.

From the evaporator 116, the refrigerant is directed to the expansion device 114, which is closed, so the refrigerant passes through expansion device 114 to expansion device 110. As the refrigerant passes through the expansion device 110, the refrigerant changes to a part-liquid part-vapor mixture due to a drop in pressure and temperature and temperature of the refrigerant. From the expansion device 110, the refrigerant flows into the condenser 108. At the condenser 108, which operates in the defrost mode as an evaporator, the condenser fan 112 blows warm indoor air over the coil of the condenser 108, which causes heat from inside the enclosed space to transfer from the inside air to the refrigerant; as a result, the refrigerant boils and takes heat away. The refrigerant leaves the condenser 108 in a low-pressure low-temperature slightly superheated state and flows into the reversing valve 106. The reversing valve 106 diverts the refrigerant back to the accumulator 104. From the accumulator 104, the refrigerant returns to the variable-speed compressor 102.

The function of the accumulator 104 is to store liquid refrigerant. In some circumstances, the liquid refrigerant will exit the evaporator 116 and reach the accumulator 104 via the reversing valve 106. In some cases, use of the accumulator 104 is a satisfactory mitigation of the problem of liquid refrigerant migration into the variable-speed compressor 102. However, in other cases, even when the accumulator 104 is present and operating properly, liquid refrigerant migration to the variable-speed compressor 102 can still occur. In such cases, liquid refrigerant migration can be managed by controlling operation of the variable-speed compressor 102 after, for example, defrost-mode termination, as described in more detail below.

In a typical refrigerant-liquid mitigation method, when a defrost cycle is terminated, the variable-speed compressor 102 is shut off to allow the reversing valve 106 to switch to the heating mode. Much of the liquid refrigerant is stored in the evaporator 116 when the defrost cycle is completed. When the heating mode is initiated, the variable-speed compressor 102 often runs at high speed due to high heating demand. In such a case, it is possible for foaming, due to oil and refrigerant mix, to occur in the accumulator 104 for as long as 3-5 minutes. When oil solubility is high enough, foaming can occur when liquid refrigerant is evaporated from a mixture of oil and liquid refrigerant during restart of the vapor-compression system 100. Prolonged foaming can cause lubricant in the variable-speed compressor 102 to be pumped out from the variable-speed compressor 102 and eventually lead to failure of the variable-speed compressor 102.

A typical embodiment of the accumulator 104 includes a J-shaped tube, including an opening on a hook portion of the J-shaped tube where refrigerant vapor can enter. The vapor refrigerant goes down and up a stem portion of the J-tube of the accumulator 104 and from the accumulator 104 is directed to the variable-speed compressor 102. As the refrigerant, in a liquid and vapor form, enters the accumulator 104, a liquid portion of the refrigerant falls to the bottom of the accumulator 104 and eventually evaporates into a vapor. The vapor is pulled into the J-tube and is directed to the variable-speed compressor 102. Thus, the accumulator 104 is designed to prevent liquid refrigerant from reaching the variable-speed compressor 102.

However, if, for example, the expansion device 114 is not operating properly and is flooding, damage to the variable-speed compressor 102 can result if the accumulator 104 cannot adequately compensate. Flooding can occur when the expansion device 114 feeds the evaporator 116 with too much of the refrigerant (i.e., more refrigerant than the evaporator 116 can evaporate), such that the variable-speed compressor 102 can eventually be damaged as the liquid refrigerant reaches the variable-speed compressor 102.

In addition, when the vapor-compression system 100 is in an off cycle such that the vapor-compression system 100 is not running and the outside ambient temperature is cooler than inside the enclosed space, in which case liquid refrigerant tends to accumulate in the evaporator 116, liquid refrigerant can collect inside the accumulator 104.

Moreover, undesirable effects can occur when the vapor-compression system 100 is operating in a defrost cycle. At the end of a defrost cycle, the reversing valve 106 shifts. Since the evaporator 116 acts as a condenser when the vapor-compression system 100 is in defrost mode, the evaporator 116 has liquid refrigerant in its coil. As a result, when the vapor-compression system 100 shifts from the defrost mode into the heating mode, liquid refrigerant that has accumulated in the evaporator 116 is directed to the accumulator 104 via the reversing valve 106.

Figure 2:
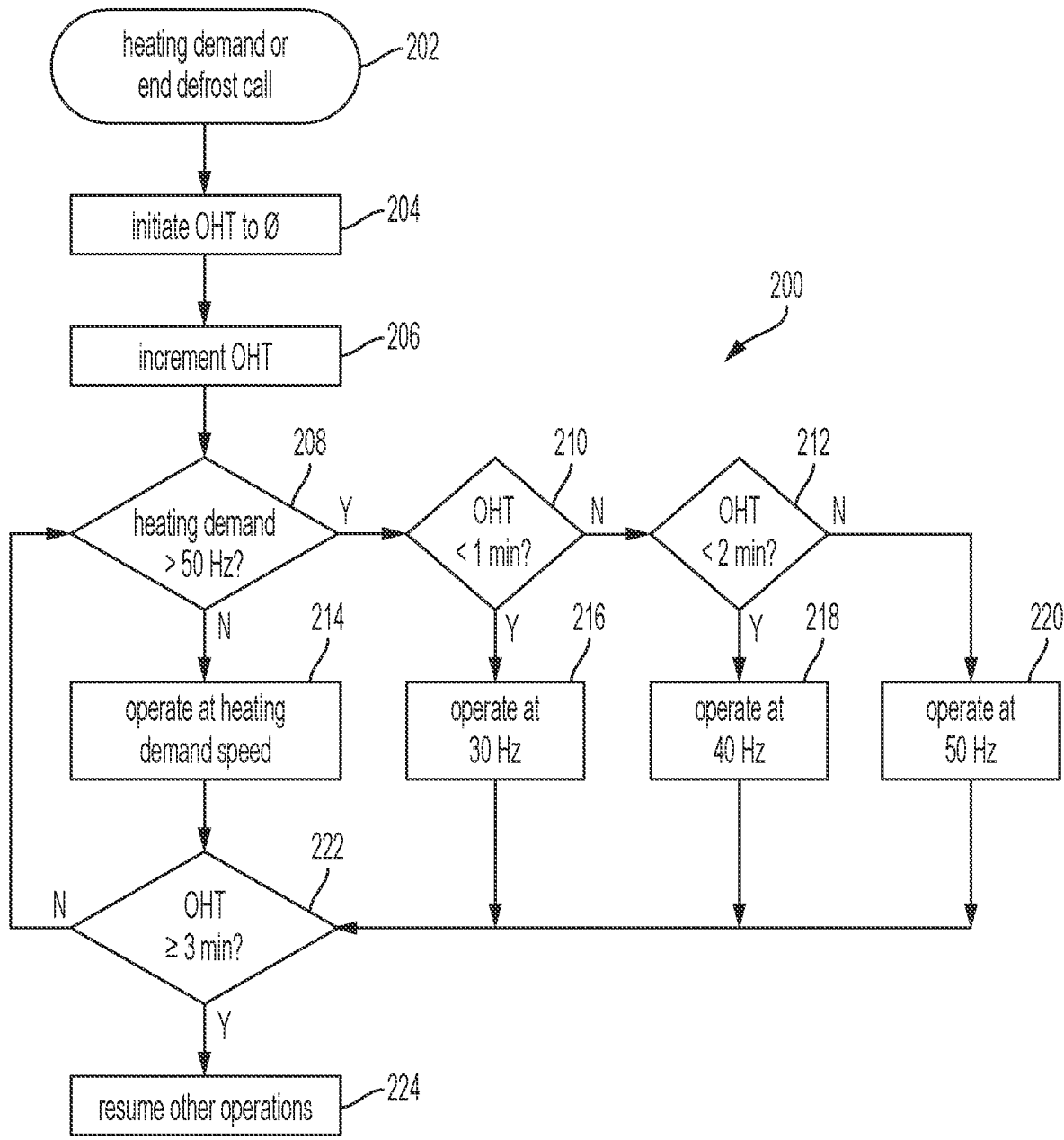
FIG. 2 is a flow diagram that illustrates a method of control to reduce liquid-refrigerant migration.

FIG. 2 is a flow diagram that illustrates a method of control to reduce liquid-refrigerant migration. A flow 200 as illustrated may be utilized in the operation of a system such as, for example, the vapor-compression system 100. Principles outlined herein relative to the flow 200 could also be employed in systems other than the illustrated vapor-compression system 100 such as a cooling-only system.

The flow 200 begins at step 202. At step 202, heating demand or the end of a defrost call occur. In other words, there is a need for the system to operate in the heating mode or the system discontinues operation in the defrost mode. From step 202, execution proceeds to step 204. At step 204, an Operation Hold Off Timer ("OHT") is set to zero. From step 204, execution proceeds to step 206, at which step the OHT is incremented.

From step 206, execution proceeds to step 208. At step 208, a determination is made as to whether the heating demand necessitates compressor operation at greater than 50 Hz. Those having skill in the art will appreciate that compressor operation frequency is greater in response to greater heating demand and is less in response to lower heating demand.

In response to a positive determination at step 208, execution proceeds to step 210. At step 210, if the OHT is less than 1 minute, execution proceeds to step 216. If, at step 210 the OHT is not less than 1 minute, execution proceeds to step 212.

At step 208, if the heating demand is not greater than 50 Hz, execution proceeds to step 214. At step 214, the system operates at the speed mandated by the heating demand. At step 210, if the OHT is less than 1 minute, execution proceeds to step 216, at which that the system operates at 30 Hz.

At step 212, if the OHT is less than 2 minutes, execution proceeds to step 218, at which step the system operates at 40 Hz. At step 212, if the OHT is not less than 2 minutes, execution proceeds to step 220, at which step the system operates at 50 Hz.

From step 214, execution proceeds to step 222, at which step a determination is made as to whether the OHT is greater than or equal to 3 minutes. If the determination at step 222 is positive, execution proceeds to step 224, at which step other operations are resumed. If, at step 222, the determination is negative, execution returns from step 222 to step 208. From each of steps 216, 218, and 220, execution proceeds to step 222.

Although the flow 200 utilizes particular frequencies and timer periods, as well as a particular number of steps between different frequencies, those having skill in the art will appreciate that different frequencies, time or periods, and number of steps between different frequencies may be utilized in accordance with design considerations without departing from the principles set forth in this disclosure.

It is thus apparent that the flow 200 allows the frequency of operation of the system to be ramped up in a stepwise fashion in order to limit liquid refrigerant flow and thereby avoid overwhelming the accumulator with too much liquid refrigerant. As such, the accumulator can better evaporate liquid refrigerant so that liquid-refrigerant migration into the compressor can be avoided or minimized. This is particularly true when heating demand is high and consequent compressor frequencies are great upon initiation of heating demand or the end of a defrost call.

Figure 3:
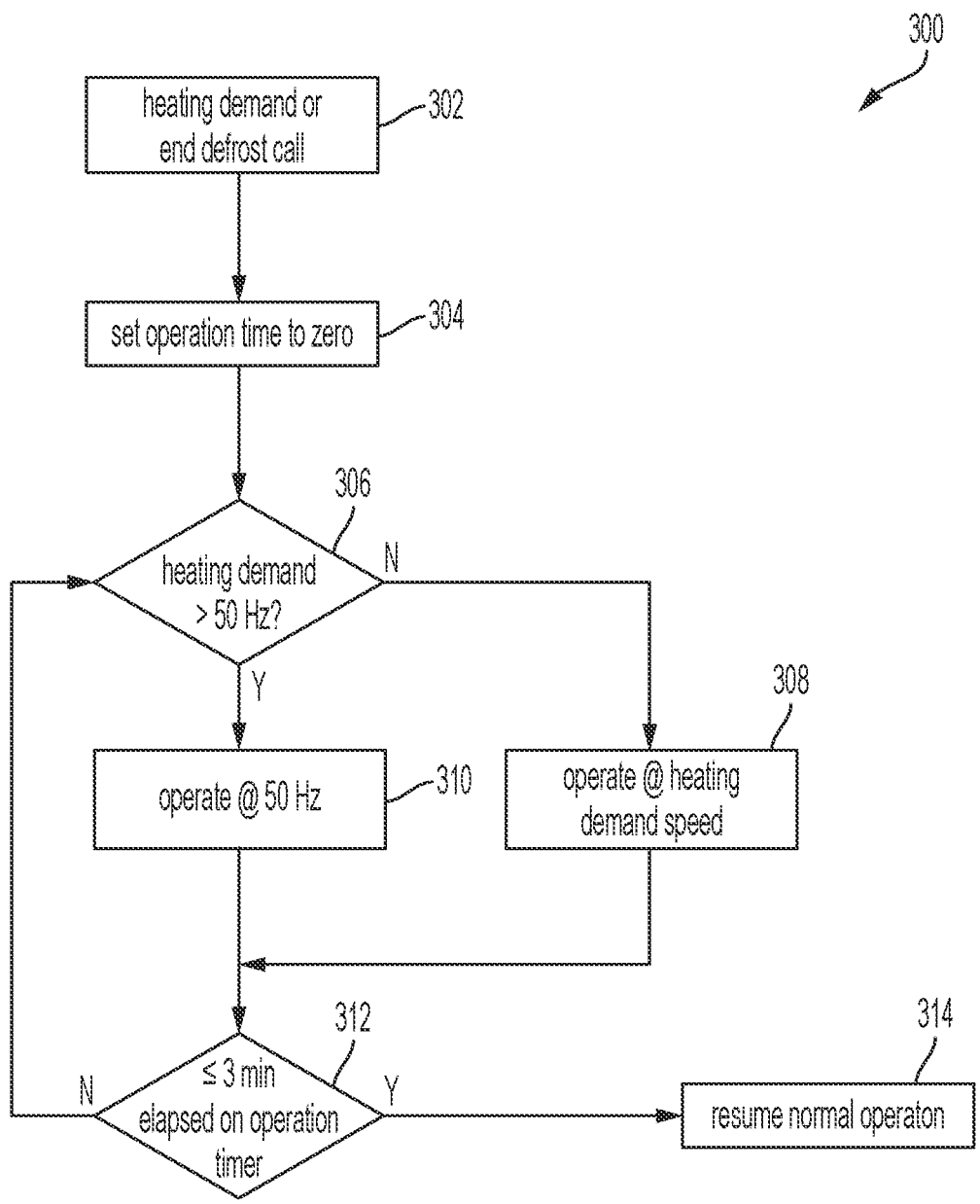
FIG. 3 is a flow diagram that illustrates another method of control to reduce liquid-refrigerant migration.

FIG. 3 is a flow diagram that illustrates a method of control to reduce liquid-refrigerant. A flow 300 as illustrated may be utilized in the operation of a system such as, for example, the vapor-compression system 100. Principles outlined herein relative to the flow 300 could also be employed in cooling-only systems.

The flow 300 begins at step 302. At step 302, heating demand or the end of a defrost call occur. In other words, there is a need for the system to operate in the heating mode or the system discontinues operation in the defrost mode. From step 302, execution proceeds to step 304.

At step 304, an operation timer is set to zero. From step 304, execution proceeds to step 306, at which step a determination is made as to whether heating demand is greater than 50 Hz. In response to a positive determination at step 306, the system operates at 50 Hz. In response to a negative determination at step 306, the system operates at the heating demand speed.

From each of steps 308 and 310, execution proceeds to step 312. At step 312, a determination is made as to whether greater than three minutes have elapsed on the operation timer. In response to a positive determination at step 312, execution proceeds to step 314, at which step normal operation of the system is resumed. In response to a negative determination at step 312, execution returns to step 306.

Although the flow 300 utilizes particular frequencies and timer periods, as well as a particular number of steps between different frequencies, those having skill in the art will appreciate that different frequencies, time or periods, and number of steps between different frequencies may be utilized in accordance with design considerations without departing from the principles set forth in this disclosure.

It is thus apparent that the flow 300 allows the frequency of operation of the system to be ramped up in a stepwise fashion in order to limit refrigerant flow and thereby avoid overwhelming the accumulator with too much liquid refrigerant. As such, the accumulator can better evaporate liquid refrigerant so that liquid-refrigerant migration into the compressor can be avoided or minimized. This is particularly true when heating demand is high and consequent compressor frequencies are great upon initiation of heating demand or the end of a defrost call.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately." "generally," and "about" may be substituted with "within 10% of" what is specified.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of a controller as appropriate. In particular embodiments, a computer-readable storage medium implements RAM or ROM.

In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others. "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of mitigating liquid-refrigerant migration using a processor, the method comprising:
   comparing a requested compressor speed of a variable-speed compressor to a pre-defined threshold;
   responsive to a determination that the requested compressor speed is greater than the pre-defined threshold, operating the variable-speed compressor at a first compressor speed that is less than the requested compressor speed;
   wherein the operating step is performed for a pre-defined time period;
   before expiration of the pre-defined time period, the comparing step is repeated;
   responsive to a determination at the repeated comparing step that the requested compressor speed is greater than the pre-defined threshold, operating the variable-speed compressor at the first compressor speed that is less than the requested compressor speed; and
   responsive to a determination at the repeated comparing step that the requested compressor speed is not greater than the pre-defined threshold, operating the variable-speed compressor at the requested compressor speed.

2. The method of claim 1, comprising, responsive to a determination that the requested compressor speed is not greater than the pre-defined threshold, operating the variable-speed compressor at the requested compressor speed.

3. The method of claim 1, comprising, before the comparing step:
   receiving one of a heating-demand call and an end-defrost call; and
   determining a requested compressor speed responsive to the receiving step.

4. The method of claim 1, wherein the method is performed on a vapor-compression system.

5. The method of claim 1, comprising:
   performing the operating step for a first pre-defined time period; and
   after expiration of the first pre-defined time period, operating the variable-speed compressor at a second compressor speed greater than the first compressor speed and less than the requested compressor speed.

6. The method of claim 5, comprising:
   performing the step of operating the variable-speed compressor at the second compressor speed for a second pre-defined time period; and
   after expiration of the second pre-defined time period, operating the variable-speed compressor at a third compressor speed greater than the second compressor speed and less than the requested compressor speed.

7. The method of claim 1, comprising, responsive to a determination that the requested compressor speed is not greater than the pre-defined threshold:
   operating the variable-speed compressor at the requested compressor speed for a pre-defined time period and
   repeating the comparing step.

8. A computer-program product comprising a non-transitory computer-usable medium having computer-readable program code embodied therein, the computer-readable program code adapted to be executed to implement a method comprising:
   comparing a requested compressor speed of a variable-speed compressor to a pre-defined threshold;

responsive to a determination that the requested compressor speed is greater than the pre-defined threshold, operating the variable-speed compressor at a first compressor speed that is less than the requested compressor speed;

wherein the operating step is performed for a pre-defined time period;

before expiration of the pre-defined time period, the comparing step is repeated;

responsive to a determination at the repeated comparing step that the requested compressor speed is greater than the pre-defined threshold, operating the variable-speed compressor at the first compressor speed; and responsive to a determination at the repeated comparing step that the requested compressor speed is not greater than the pre-defined threshold, operating the variable-speed compressor at the requested compressor speed.

9. The computer-program product of claim 8, the method comprising, responsive to a determination that the requested compressor speed is not greater than the pre-defined threshold, operating the variable-speed compressor at the requested compressor speed.

10. The computer-program product of claim 8, the method comprising, before the comparing step:
    receiving one of a heating-demand call and an end-defrost call; and
    determining a requested compressor speed responsive to the receiving step.

11. The computer-program product of claim 8, wherein the method is performed on a vapor-compression system.

12. The computer-program product of claim 8, the method comprising:
    performing the operating step for a first pre-defined time period; and
    after expiration of the first pre-defined time period, operating the variable-speed compressor at a second compressor speed greater than the first compressor speed and less than the requested compressor speed.

13. The computer-program product of claim 12, the method comprising:
    performing the step of operating the variable-speed compressor at the second compressor speed for a second pre-defined time period; and
    after expiration of the second pre-defined time period, operating the variable-speed compressor at a third compressor speed greater than the second compressor speed and less than the requested compressor speed.

14. The computer-program product of claim 8, the method comprising, responsive to a determination that the requested compressor speed is not greater than the pre-defined threshold:
    operating the variable-speed compressor at the requested compressor speed for a pre-defined time period and repeating the comparing step.

15. An information handling system comprising a processor, wherein the processor is operable to implement a method comprising:
    comparing a requested compressor speed of a variable-speed compressor to a pre-defined threshold; and
    responsive to a determination that the requested compressor speed is greater than the pre-defined threshold, operating the variable-speed compressor at a first compressor speed that is less than the requested compressor speed;
    wherein the operating step is performed for a pre-defined time period;
    before expiration of the pre-defined time period, the comparing step is repeated;
    responsive to a determination at the repeated comparing step that the requested compressor speed is greater than the pre-defined threshold, operating the variable-speed compressor at the first compressor speed; and
    responsive to a determination at the repeated comparing step that the requested compressor speed is not greater than the pre-defined threshold, operating the variable-speed compressor at the requested compressor speed.

16. The information handling system of claim 15, the method comprising, responsive to a determination that the requested compressor speed is not greater than the pre-defined threshold, operating the variable-speed compressor at the requested compressor speed.

17. The information handling system of claim 15, the method comprising, before the comparing step:
    receiving one of a heating-demand call and an end-defrost call; and
    determining a requested compressor speed responsive to the receiving step.

18. The information handling system of claim 15, wherein the method is performed on a vapor-compression system.

* * * * *